2,995,528
OXIDATION PROCESSES

Dennis Albert Dowden and Alexander Muirhead Ure Caldwell, both of Norton-on-Tees, England, assignors to Imperial Chemical Industries Limited, Millbank, London, England, a corporation of Great Britain
No Drawing. Filed July 2, 1957, Ser. No. 669,456
Claims priority, application Great Britain July 6, 1956
1 Claim. (Cl. 252—464)

This invention relates to processes for the oxidation of organic compounds, especially hydrocarbons, and to catalysts therefor.

Processes for the oxidation of organic compounds, especially hydrocarbons, in the vapour phase by means of oxygen-containing gases in the presence or absence of catalysts, such as vanadia, are well known, but have not proved entirely satisfactory primarily due to the difficulties in avoiding combustion to carbon oxides and in preventing the highly exothermic process getting out of control. The present invention is an improvement in such oxidation processes which makes possible better operation, due to the catalyst being stabilised, and decreases the amount of combustion to carbon dioxide.

According to the present invention there is provided a process for converting aliphatic compounds, especially hydrocarbons, to oxygenated compounds which comprises passing the said compound in admixture with oxygen or an oxygen-containing gas in the vapour phase at a moderately elevated temperature over an oxidation catalyst comprising the metal salt of a compound comprising vanadium pentoxide in combination with a lower vanadium oxide in which the valency of vanadium is from 2 to 4. A suitable range of temperatures is for example from 250° C., preferably at least 300° C., to 500° C. The process of the invention is of considerable value in relation to the oxidation of olefines, having at least three carbon atoms in the molecule, e.g., isobutene and propylene, to products such as aldehydes, ketones and acids. It has not been found possible to oxidise ethylene or ethane according to the process to useful products.

The catalyst comprises a vanadyl vanadate (vanadicovanadate or hypo-vanadato-vanadate) of a metal such as thallium, silver, potassium, sodium, lithium, rubidium, lead, tin and copper, or a vanadyl vanadate of thallium and potassium; or of thallium and silver; or of silver and potassium. Preferably the ratio, $M_2O:V_2O_5$ (where M=the metal) is less than 0.3 but not less than 0.01. When this ratio is below 0.01 there is increasing tendency for oxidation to carbon oxides.

The catalysts may be promoted or stabilised by, e.g., the oxides of calcium, strontium, and magnesium.

Various methods of preparation may be used, e.g.:

(1) A suitable metal compound may be fused with say vanadium pentoxide at about 700° to 800° C., the fusion product cooled and ground to a fineness such that the surface area is 0.5 to 3.0 sq. metres/gm. as determined by the Brunauer-Emmett-Teller gas absorption technique. The powder may be used in this form, or supported on one of the common inert supports, e.g., corundum.

(2) Sodium divanadyl vanadate may be prepared as follows. Vanadium pentoxide is reduced with excess of a saturated solution of sulphur dioxide in sulphuric acid, and the excess $SO_2$ is expelled by boiling. The hot solution is mixed with 6 grams of vanadium pentoxide in sodium hydroxide, and after standing for several days is acidified with acetic acid and mixed with a cold saturated solution of sodium acetate. The resulting crystals of sodium di-vanadyl vanadate are washed with aqueous sodium acetate and with alcohol.

It is preferred to activate the catalyst prior to use by heating to a temperature higher than, e.g., about 100° C. higher than, the operating temperature in the oxidation process, since thereby the extent of complete combustion to carbon oxides can be further decreased. The proportion of air to hydrocarbon may vary within for example 95 to 85 parts by volume of air to 5 to 15 parts by volume of hydrocarbon, and for other gases will be altered in proportion to their oxygen content. Other things being equal, these catalysts are used with short contact times, because of the economic benefits resulting from increased output.

Ozone may be used in the process instead of oxygen.

The following facts have been found for the oxidation by air of isobutene to valuable compounds according to the present invention, but apply in a general way to other oxidations.

(a) The optimum catalyst composition depends on the reaction operating temperature. Thus a $Tl_2O:V_2O_5$ molar ratio of 0.05:1 is preferred in thallium vanadyl vanadate when operating at 420° C., although a range of 0.01 to 0.30 in this ratio can be tolerated. At the same temperature with potassium vanadyl vanadate, the optimum range of the $K_2O:V_2O_5$ molar ratio is 0.01 to 0.20. Also at the same temperature if the $M_2O:V_2O_5$ molar ratio (where M=thallium or potassium) is less than 0.01, much higher combustion to carbon oxides occurs; whereas when this ratio is greater than 0.30, there is a marked decrease in activity, as shown by the low space time yields of desired oxygenated compounds.

(b) At 420° C. using a thallium vanadyl vanadate catalyst according to the invention there is, compared with the prior art vanadium pentoxide catalyst, a fourfold decrease in the production of carbon oxides at the same spare time yields of oxygenated compounds.

(c) Examination of the behaviour of a thallium vanadyl vanadate catalyst ($Tl_2O:V_2O_5$ molar ratio=0.05) in the oxidation of isobutene at 420° C. showed that its catalytic activity was unimpaired after 30 hours, and that the hourly yield had increased slightly. The products comprised formaldehyde, acetic acid, propionic acid, methacrolein, acetone and glyoxal.

Thallium vanadyl vanadate is preferred for the oxidation of isobutene because of its efficiency; and silver or thallium vanadyl vanadate for the oxidation of propylene. The potassium salt is nearly as effective in each of these two oxidations as the salts mentioned and is cheaper.

Preferably the catalyst comprises the above defined metal salt carried on a granule support comprising a material which has substantially no oxidative catalytic effect under the reaction conditions. Suitable such supports are, for example, alundum, silicon carbide, porcelain and firebrick, of which the former two, especially silicon carbide, are preferred account of their great inertness.

The invention is illustrated by the following examples.

Example 1

A thallium vanadyl vanadate catalyst was prepared by grinding 1.29 grams of thallium carbonate and 10 grams of vanadium pentoxide together, well mixing, and fusing the mixture. On cooling, the fused product evolved oxygen. It was ground to pass 100 B.S.S. and the powder was compounded on to 1/16" to 1/8" corundum particles by pasting, e.g., with acetone. 5 grams of the powder was needed to coat 30 mls. of the loosely packed corundum particles.

A mixture of 85 parts by volume of air and 15 parts by volume of isobutene measured at 15.5° C. and atmospheric pressure was passed at a rate of 100 litres per hour through a silica reactor packed with 30 mls. of the above catalyst and heated externally by a salt bath comprising sodium nitrite and sodium nitrate maintained at 400° C.

The pass conversion of isobutene was 17% molar and the yield of formaldehyde, acetic acid, glyoxal, propionic acid and methacrolein was 95% of the theoretical.

*Example 2*

A potassium vanadyl vanadate catalyst was prepared from 0.38 gram of potassium carbonate and 10 grams of vanadium pentoxide in a similar manner to that described in Example 1.

Using this catalyst under the conditions described in Example 1, isobutene was oxidised to similar oxygenated compounds with a pass conversion of 28% molar and a yield of 57% of theoretical.

*Example 3*

A silver vanadyl vanadate catalyst was prepared from 0.152 gram of silver carbonate and 10 grams of vanadium pentoxide in a similar manner to that described in Example 1.

Using this catalyst under the conditions described in Example 1, isobutene was oxidised to similar oxygenated compounds with a pass conversion of 24% molar and a yield of 50% of theoretical.

Among other compounds that can be oxidised to valuable compounds are the aliphatic aldehydes which yield acids; and the aliphatic ketones. The compound should be capable of ready vaporisation under the reaction conditions. Paraffins containing three and more carbon atoms in the molecule, e.g., propane, butane and isobutane can be oxidised to yield the same compounds as the corresponding alkenes.

Contact times, calculated on the bulk catalyst volume and the whole reaction mixture, of, e.g., from about 0.1 second to about 10 seconds have been found satisfactory.

In calculating the contact time and the air:starting compound volumetric ratio it is assumed that the mixture obeys the gas laws, and volumes are measured at 760 mms. and 15.5° C.

In this specification in defining the composition of the catalyst the vanadium although not all present in the higher state of oxidation is for convenience calculated at $V_2O_5$.

We claim:

An oxidation catalyst consisting essentially of the vanadyl vanadate of at least one monovalent metal selected from the group consisting of thallium, silver, potassium, sodium, lithium, and rubidium, in which the molar ratio of the oxide of said monovalent metal to total oxides of vanadium present, calculated as $V_2O_5$, is from 1:100 to 1:20, and said vanadyl vanadate is carried on an oxidatively inert granular support.

References Cited in the file of this patent

UNITED STATES PATENTS

| | | |
|---|---|---|
| 1,844,392 | Jaeger | Feb. 9, 1932 |
| 1,880,322 | Jaeger | Oct. 4, 1932 |
| 2,114,798 | Foster | Apr. 19, 1938 |
| 2,118,567 | Milas et al. | May 24, 1938 |
| 2,504,034 | Morrell et al. | Apr. 11, 1950 |
| 2,644,837 | Schweitzer | July 7, 1953 |